(12) United States Patent
Im et al.

(10) Patent No.: US 10,295,726 B2
(45) Date of Patent: May 21, 2019

(54) DISPLAY APPARATUS

(71) Applicant: Samsung Display Co., Ltd., Yongin-Si, Gyeonggi-Do (KR)

(72) Inventors: Hyundeok Im, Seoul (KR); Jaebyung Park, Seoul (KR); Daehyun Kim, Hwaseong-si (KR); Hyunmin Cho, Seoul (KR)

(73) Assignee: Samsung Display Co., Ltd. (KR)

( * ) Notice: Subject to any disclaimer, the term of this patent is extended or adjusted under 35 U.S.C. 154(b) by 475 days.

(21) Appl. No.: 15/069,476

(22) Filed: Mar. 14, 2016

(65) Prior Publication Data
US 2017/0003438 A1     Jan. 5, 2017

(30) Foreign Application Priority Data
Jun. 30, 2015  (KR) .................. 10-2015-0093536

(51) Int. Cl.
*F21V 8/00*      (2006.01)
*G02B 5/30*      (2006.01)
*G02F 1/1335*    (2006.01)

(52) U.S. Cl.
CPC ......... *G02B 6/0056* (2013.01); *G02B 5/3058* (2013.01); *G02F 1/13362* (2013.01); *G02B 6/0068* (2013.01); *G02F 1/133621* (2013.01)

(58) Field of Classification Search
CPC ............ G09G 2320/0252; G02B 26/02; G02F 1/13362
See application file for complete search history.

(56) References Cited

U.S. PATENT DOCUMENTS

| | | | |
|---|---|---|---|
| 8,380,026 B2 | 2/2013 | Van Ostrand et al. | |
| 2012/0169950 A1* | 7/2012 | Tatzel | G02B 5/3083 349/18 |
| 2014/0232728 A1* | 8/2014 | Eakin | H01L 51/5281 345/501 |

FOREIGN PATENT DOCUMENTS

| | | |
|---|---|---|
| JP | 3800292 B2 | 7/2006 |
| JP | 4633088 B2 | 2/2011 |

(Continued)

OTHER PUBLICATIONS

Shieh, Advanced Methods for Field-Sequential-Color LCDs with Associated Power Reduction Advantages, Information Display, Sep. 2010, 18-322, vol. 26 No. 9, Society for Information Display, Campbell, CA.

(Continued)

*Primary Examiner* — Anh T Mai
*Assistant Examiner* — Zachary J Snyder
(74) *Attorney, Agent, or Firm* — Innovation Counsel LLP

(57) ABSTRACT

A display apparatus includes a light source and a display panel. The light source emits a light. The display panel includes a first polarizing plate, a second polarizing plate, a third polarizing plate, and a shutter. The first polarizing plate receives the light provided from the light source and incident to a lower portion thereof and linearly polarizes the light incident thereto. The second polarizing plate is disposed on the first polarizing plate and circularly polarizes the light exiting through the first polarizing plate. The third polarizing plate is disposed on the second polarizing plate and linearly polarizes the light incident thereto. The shutter is disposed on the first polarizing plate and mechanically deforms in a thickness direction of the first polarizing plate in response to (Continued)

an electrical signal. The display apparatus displays a grayscale in accordance with mechanical deformation of the shutter.

20 Claims, 14 Drawing Sheets

(56) References Cited

FOREIGN PATENT DOCUMENTS

| | | |
|---|---|---|
| JP | 2012-216905 A | 11/2012 |
| KR | 10-2010-0118055 A | 11/2010 |
| KR | 10-2013-0129008 A | 11/2013 |

OTHER PUBLICATIONS

Lazarev, Thin Coatable Birefringent Film, Proceedings of SPIE, Jan. 2006, vol. #6286-10, The International Society for Optical Engineering.

Lim, A surface with a biomimetic micropattern reduces colonization of *Mycobacterium abscessus,* FEMS, Sep. 9, 2014, 17-22, vol. 360, Federation of European Microbiological Societies.

Hu et al., "Linearly Polarized Emission from Colloidal Semiconductor Quantum Rods," obtained from Science Magazine (www.sciencemag.com), published by American Association for the Advancement of Science, Dec. 9, 2012, pp. 1-5.

\* cited by examiner

DISPLAY APPARATUS

CROSS-REFERENCE TO RELATED APPLICATION

This U.S. non-provisional patent application claims priority under 35 U.S.C. § 119 of Korean Patent Application No. 10-2015-0093536, filed on Jun. 30, 2015, the contents of which are hereby incorporated by reference in its entirety.

BACKGROUND

1. Field of Disclosure

The present disclosure relates to a display apparatus. More particularly, the present disclosure relates to a display apparatus including a non-self-emissive display panel.

2. Description of the Related Art

A display panel is classified into a self-emissive display panel and a non-self-emissive display panel in accordance with whether the display panel requires a separate light source to display an image or not. The self-emissive display panel may include an organic light emitting display panel, and the non-self-emissive display panel may include a liquid crystal display panel.

Generally, the non-self-emissive display panel uses a backlight unit that generates a light. The non-self-emissive display panel controls a transmittance of the light provided from the backlight unit to display grayscales. The liquid crystal display panel controls an arrangement of liquid crystal molecules to control the transmittance of the light incident thereto. However, a response speed of the liquid crystal molecules may be too slow for certain applications of the display panel that require a quick response (e.g., gaming).

SUMMARY

The present disclosure provides a display apparatus including a non-self-emissive display panel operated in the new operation mode to display an image.

The present disclosure provides a display apparatus having improved response speed.

Embodiments of the inventive concept provide a display apparatus including a light source and a display panel. The light source is configured to emit a light. The display panel is configured to display an image using the light provided from the light source.

The display panel includes a first polarizing plate, a second polarizing plate, a third polarizing plate, and a shutter.

The first polarizing plate is configured to receive the light provided from the light source and incident to a lower portion of the first polarizing plate and to linearly polarize the light incident thereto. The second polarizing plate is disposed on the first polarizing plate and configured to circularly polarize the light exiting through the first polarizing plate. The third polarizing plate is disposed on the second polarizing plate and configured to linearly polarize the light incident thereto.

The shutter is disposed on the first polarizing plate and configured to mechanically deform in a thickness direction of the first polarizing plate in response to an electrical signal.

The display apparatus displays a grayscale in accordance with mechanical deformation of the shutter.

A distance between the second and third polarizing plates may be controlled by mechanical deformation of the shutter.

The first polarizing plate may have a first transmission axis, the second polarizing plate may have a second transmission axis inclined at about 45 degrees with respect to the first transmission axis, and the third polarizing plate may have a third transmission axis substantially parallel to or substantially perpendicular to the first transmission axis.

The display panel may include a plurality of pixel areas defined therein. The shutter may be provided in a plural number. Each of the shutters may be independently disposed within a different one of the pixel areas.

The display panel may further include a first electrode and a second electrode. The first electrode may be disposed on the first substrate. The second electrode may be disposed to face the first electrode such that the shutter is disposed between the first and second electrodes. The electrical signal may be an electric field generated by voltages respectively applied to the first and second electrodes.

The first polarizing plate may be disposed on the first electrode. The shutter may be disposed between the first and second polarizing plates. The second polarizing plate may be spaced apart from the second electrode, and the second and third polarizing plates may be spaced apart from each other.

The display panel may further include an optical compensation layer disposed between the first electrode and the first polarizing plate.

The display panel may further include an insulating layer disposed between the first electrode and the shutter. The second electrode may make contact with the shutter and the insulating layer. The second electrode may be a flexible transparent electrode.

The light emitted from the light source may be a blue light. The display panel may further include a light emitting layer that absorbs the blue light and emits a light having a wavelength longer than a wavelength of the blue light.

The display panel may display the image corresponding to one screen in the unit of frame. The frame may include a red sub-frame in which a red image is displayed, a green sub-frame in which a green image is displayed, and a blue sub-frame in which a blue image is displayed.

The light source may be disposed adjacent to a side surface of the display panel when viewed in a plan view. The light source may include a red light source, a green light source, and a blue light source.

The display panel may include a first area and a second area farther away from the light source than the first area when viewed in a plan view. A duty ratio of a data voltage applied to a pixel disposed in the first area to display an image having a first brightness in the first area may be smaller than a duty ratio of a data voltage applied to a pixel disposed in the second area to display an image having the first brightness in the second area.

Embodiments of the inventive concept provide a display apparatus including a light source, a first polarizing plate, a second polarizing plate, a third polarizing plate, and a shutter.

The light source is configured to emit a light. The first polarizing plate is configured to receive the light provided from the light source and incident to a lower portion of the first polarizing plate and has a first transmission axis. The second polarizing plate is disposed on the first polarizing plate and has a second transmission axis substantially perpendicular to or parallel to the first transmission axis. The third polarizing plate is disposed between the first and second polarizing plates and has a third transmission axis crossing the first and second axes. The shutter is disposed between the first and second polarizing plates and is configured to mechanically deform in a thickness direction of the first polarizing plate in response to an electrical signal.

According to the above, the display apparatus may display the image using the new operation mode.

In addition, a response time of the display apparatus may be improved.

BRIEF DESCRIPTION OF THE DRAWINGS

The above and other advantages of the present disclosure will become readily apparent when the following detailed description is considered in conjunction with the accompanying drawings wherein.

DETAILED DESCRIPTION

The following description and the accompanying drawings are provided to assist in a comprehensive understanding of various embodiments of the present disclosure. Although various specific details are included in the present disclosure to assist in that understanding, they are to be regarded as merely exemplary. Accordingly, those of ordinary skill in the art would recognize that various changes and modifications of the various embodiments described herein may be made without departing from the scope and spirit of the present disclosure. In addition, descriptions of well-known functions and constructions may be milled for clarity and conciseness.

Hereinafter, the present system and method are explained in detail with reference to the accompanying drawings.

Figure 1:
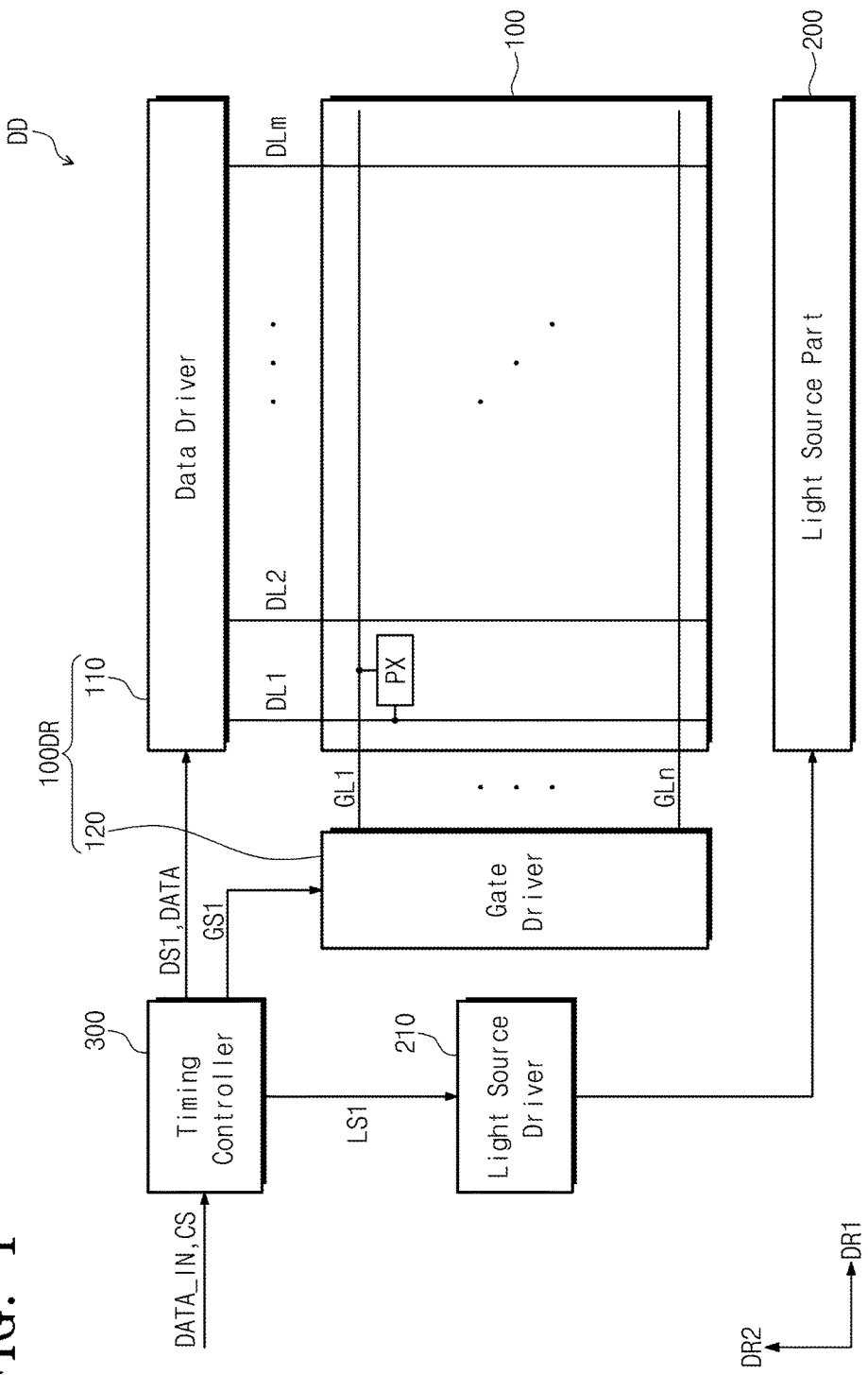
FIG. 1 is a block diagram showing a display apparatus according to an exemplary embodiment of the present disclosure.

FIG. 1 is a block diagram showing a display apparatus DD according to an exemplary embodiment of the present disclosure.

Referring to FIG. 1, the display apparatus DD includes a display panel 100, a display panel driver 100DR, a light source part 200, a light source driver 210, and a timing controller 300.

The display panel 100 generates an image corresponding to image data input thereto. The display panel 100 may be, but not limited to, a non-self-emissive display panel.

The display panel 100 includes a plurality of gate lines GL1 to GLn, a plurality of data lines DL1 to DLm, and a plurality of pixels PX. The gate lines GL1 to GLn extend in a first direction DR1 and are arranged in a second direction DR2 crossing the first direction DR1 to be spaced apart from each other. The data lines DL1 to DLm extend in the second direction DR2 and are arranged in the first direction DR1 to be spaced apart from each other. Each of the pixels PX is connected to a corresponding gate line of the gate lines GL1 to GLn and a corresponding data line of the data lines DL1 to DLm. FIG. 1 shows one pixel PX connected to a first gate line GL1 and a first data line DL1 as a representative example.

The timing controller 300 receives input data DATA_IN and control signals CS from outside of the display apparatus DD, e.g., a graphic controller (not shown). The input data DATA_IN may include red, green, and blue data. The control signals CS may include a vertical synchronization signal as a frame distinction signal, a horizontal synchronization signal as a row distinction signal, a data enable signal maintained at a high level during a period in which data are output to indicate a data input period, and a clock signal.

The timing controller 300 generates a gate control signal GS1 and a data control signal DS1 on the basis of the control signals CS. The timing controller 300 applies the gate control signal GS1 to a gate driver 120 and applies the data control signal DS1 to a data driver 110.

The display panel driver 100DR may drive the display panel 100. The display panel driver 100DR includes the data driver 110 and the gate driver 120. The gate control signal GS1 is used to drive the gate driver 120, and the data control signal DS1 is used to drive the data driver 110.

The data driver 110 generates grayscale voltages corresponding to output data DATA converted on the basis of the data control signal DS1 and applies the grayscale voltages to the data lines DL1 to DLm. The data control signal DS1 may include a horizontal start signal to indicate the start of transmission of the converted output data DATA to the data driver 110, a load signal to indicate when to apply the grayscale voltages to the data lines DL1 to DLm, an inverting signal to indicate when to invert a polarity of data voltages with respect to a common voltage.

The gate driver 120 generates gate signals on the basis of the gate control signal GS1 and applies the gate signals to the gate lines GL1 to GLn. The gate control signal GS1 may include a scan start signal indicating the start of scanning of the gate lines GL1 to GLn, at least one clock signal controlling an output timing of a gate-on voltage, and an output enable signal restricting duration of the gate-on voltage. The gate driver 120 sequentially outputs the gate signals. Accordingly, the pixels PX are sequentially scanned by the gate signals in the unit of row.

The light source part 200 provides the display panel 100 with the light. The light source part 200 provides the light to a rear surface of the display panel 100 or a side surface of the display panel 100. The light source part 200 includes at least one light source. The light source may be, but not limited to, a light emitting diode.

The light source driver 210 receives a light source control signal LS1 from the timing controller 300. The light source driver 210 drives the light source part 200 in response to the light source control signal LS1. The light source driver 210 may be provided in a printed circuit board on which a plurality of electronic components is mounted.

Figure 2:
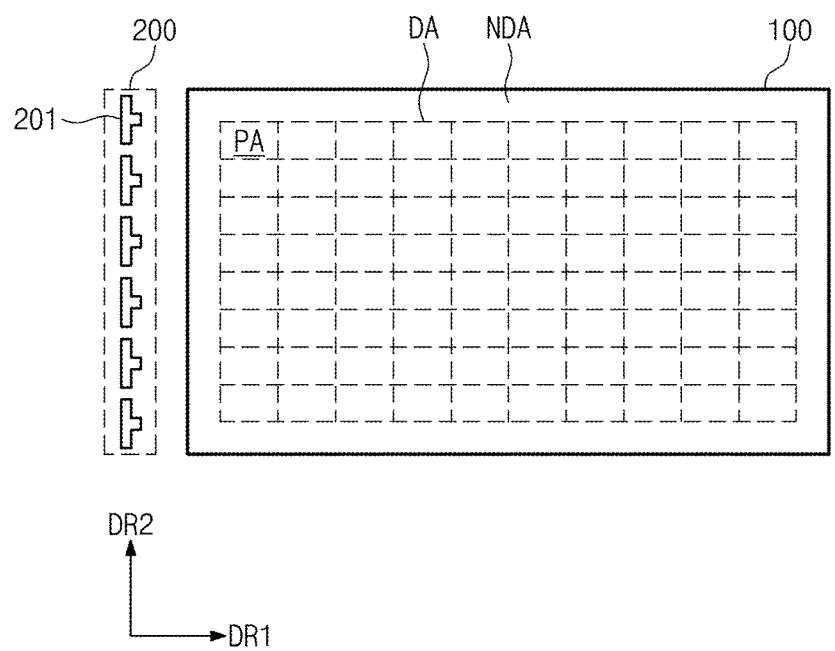
FIG. 2 is a plan view showing a display panel and a light source part shown in FIG. 1.

FIG. 2 is a plan view showing the display panel 100 and the light source part 200 shown in FIG. 1.

Referring to FIG. 2, the display panel 100 includes a display area DA and a non-display area NDA. The display area DA is configured to display the image. The non-display area NDA is disposed adjacent to the display area DA and configured to not display the image.

The display area DA includes a plurality of pixel areas PA. The pixel areas PA are arranged in a matrix form. The pixels PX (refer to FIG. 1) are arranged in the pixel areas PA, respectively.

In the exemplary embodiment shown in FIG. 2, the light source part 200 provides the light to one side surface of the display panel 100. The light source part 200 includes a plurality of light sources 201. The light sources 201 include red, green, and blue light sources. According to another embodiment, the light sources 201 may include white light sources.

Figure 3:
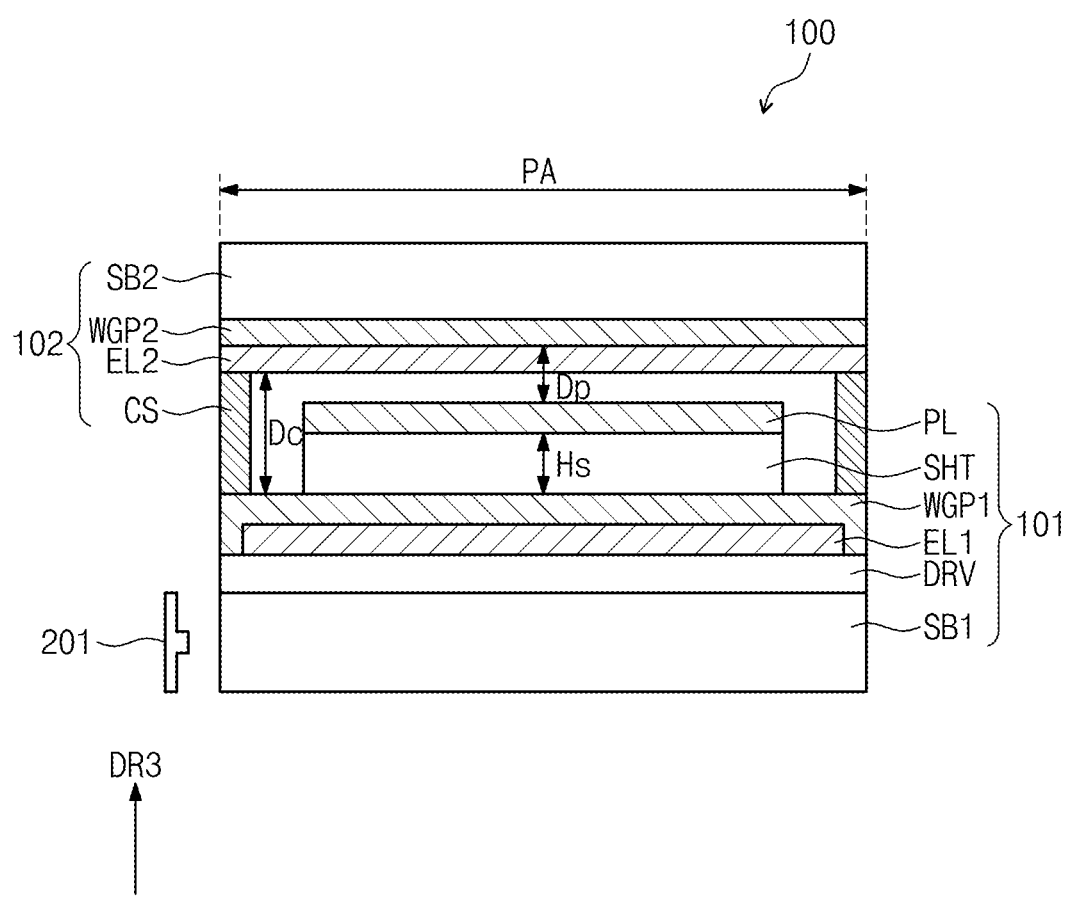
FIG. 3 is a cross-sectional view showing one light source and one pixel area of a display panel according to an exemplary embodiment of the present disclosure.

FIG. 3 is a cross-sectional view showing one light source and one pixel area PA of the display panel 100 according to an exemplary embodiment of the present disclosure.

Referring to FIGS. 1 to 3, the light source 210 provides the light to one side surface of a first substrate SB1.

The display panel 100 includes a lower substrate 101 and an upper substrate 102.

The lower substrate 101 includes the first substrate SB1, a driving layer DRV, a first electrode EL1, a first linear polarizing plate WGP1, a shutter SHT, and a circular polarizing plate PL.

The first substrate SB1 may be, but not limited to, a flat insulating substrate. The first substrate SB1 may be formed of glass, plastic, or ceramic. The first substrate SB1 guides the light provided from the light source 201 and incident thereto to allow the light to travel in a direction DR3 (hereinafter, referred to as a third direction) from the lower substrate 101 to the upper substrate 102. The first substrate SB1 may include a transparent material and serve as a light guide plate.

The driving layer DRV is disposed on the first substrate SB1. The driving layer DRV includes a thin film transistor (not shown). The thin film transistor includes a gate electrode connected to the first gate line GL1, an input electrode connected to the first data line DL1, and an output electrode connected to the first electrode EL1. The thin film transistor outputs the data voltage applied to the input electrode to the first electrode EL1 in response to the gate signal applied to the gate electrode.

The first electrode EL1 is disposed on the driving layer DRV. The first electrode EL1 may be a transparent electrode. The first electrode EL1 may be disposed in each pixel area PA. Two first electrodes EL1 respectively disposed in two pixel areas adjacent to each other may be insulated from each other.

The first linear polarizing plate WGP1 is disposed on the first electrode EL1. The first linear polarizing plate WGP1 linearly polarizes the light incident thereto. In the present exemplary embodiment, the first linear polarizing plate WGP1 has a first transmission axis and transmits a light component vibrating in a direction substantially parallel to the first transmission axis among the light incident thereto.

The first linear polarizing plate WGP1 may be a reflective polarizing plate or an absorbing polarizing plate. When the first linear polarizing plate WGP1 is the reflective polarizing plate, the first linear polarizing plate WGP1 reflects the light among the light incident thereto except for the light component vibrating in the direction substantially parallel to the first transmission axis among the light incident thereto.

When the first linear polarizing plate WGP1 is the absorbing polarizing plate, the first linear polarizing plate WGP1 absorbs the light among the light incident thereto except for the light component vibrating in the direction substantially parallel to the first transmission axis among the light incident thereto.

The first linear polarizing plate WGP1 may be a wire grid polarizing plate, in which case it may include a plurality of metal lines extending in the direction substantially perpendicular to the first transmission axis and be arranged in a direction crossing the first transmission axis to be spaced apart from each other.

In the present exemplary embodiment, the light emitted from the light source 201 is incident to the first linear polarizing plate WGP1 after passing through the first substrate SB1 and is linearly polarized while passing through the first linear polarizing plate WGP1.

The shutter SHT is disposed on the first linear polarizing plate WGP1. The shutter SHT may mechanically deform in the third direction DR3 in response to an electrical signal, e.g., a voltage, a current, an electric field, etc. Hereinafter, the electrical signal is described as the electric field. The shutter SHT expands in the third direction DR3 in accordance with the electric field applied thereto.

The shutter SHT may include a piezoelectric element. The piezoelectric element may be a ceramic or an electro active polymer (EAP). The EAP may be silicone or acryl.

The shutter SHT may be formed by coating the piezoelectric element on the first linear polarizing plate WGP1 and applying heat and pressure on the piezoelectric element using a mold. As another way, the shutter SHT may be formed by patterning the piezoelectric element formed on the first linear polarizing plate WGP1.

The circular polarizing plate PL is disposed on the shutter SHT. The circular polarizing plate PL is overlapped with the shutter SHT. Therefore, the light incident to a lower portion of the shutter SHT may be incident to the circular polarizing plate PL after passing through the shutter SHT.

The circular polarizing plate PL circularly polarizes the linearly-polarized light incident thereto. The circular polarizing plate PL has a transmission axis inclined at about 45 degrees with respect to the first transmission axis. The circular polarizing plate PL circularly polarizes the linearly-polarized light exiting from the first linear polarizing plate WGP1.

According to another embodiment, the positions of the driving layer DRV, the first electrode EL1, and the first linear polarizing plate WGP1 may be changed with respect to each other.

Although not shown in figures, the lower substrate 101 may further include a reflective layer disposed under the first substrate SB1. The reflective layer reflects the light emitted from the light and incident thereto. The reflective layer may improve the light efficiency of the light traveling upward from the first substrate SB1 among the light emitted from the light source 201.

The upper substrate 102 includes a second substrate SB2, a second linear polarizing plate WGP2, a second electrode EL2, and a spacer CS.

The second substrate SB2 has a flat insulating substrate. The second substrate SB2 may include glass, plastic, or ceramic.

The second linear polarizing plate WGP2 is disposed under the second substrate SB2. The second linear polarizing plate WGP2 linearly polarizes the light incident thereto. In the present exemplary embodiment, the second linear polarizing plate WGP2 has a second transmission axis and transmits a light component vibrating in a direction substantially parallel to the second transmission axis among the light incident thereto.

The second transmission axis may be substantially parallel to or substantially perpendicular to the first transmission axis. Hereinafter, the following description is provided for the case in which the second transmission axis is substantially parallel to the first transmission axis.

The second linear polarizing plate WGP2 may be a reflective polarizing plate or an absorbing polarizing plate. When the second linear polarizing plate WGP2 is the reflective polarizing plate, the second linear polarizing plate WGP2 reflects the light among the light incident thereto except for the light component vibrating in the direction substantially parallel to the second transmission axis among the light incident thereto. When the second linear polarizing plate WGP2 is the absorbing polarizing plate, the second linear polarizing plate WGP2 absorbs the light among the light incident thereto except for the light component vibrating in the direction substantially parallel to the second transmission axis among the light incident thereto.

The second linear polarizing plate WGP2 may be a wire grid polarizing plate, in which case it may include a plurality of metal lines extending in the direction substantially perpendicular to the second transmission axis and being arranged in a direction crossing the second transmission axis to be spaced apart from each other.

The circularly-polarized light by the circular polarized plate PL is incident to the second linear polarizing plate WGP2. A transmittance of the second circularly-polarized light to the second linear polarizing plate WGP2 is determined in accordance with a phase delay distance Dp between the circularly polarizing plate PL and the second linear polarizing plate WGP2. This is described in detail later.

The second electrode EL2 is disposed under the second linear polarizing plate WGP2. The second electrode EL2 may be a transparent electrode. The second electrode EL2 receives a constant common voltage.

The spacer CS is disposed at an edge of the pixel area PA. The spacer CS is disposed in all the pixel areas PA or in several pixel areas PA. The spacer CS maintains a cell gap Dc. The spacer CS includes a light blocking material, and thus absorbs the light incident thereto.

According to another embodiment, the positions of the second linear polarizing plate WGP2 and the second electrode EL2 may be changed with respect to each other.

Figure 4:
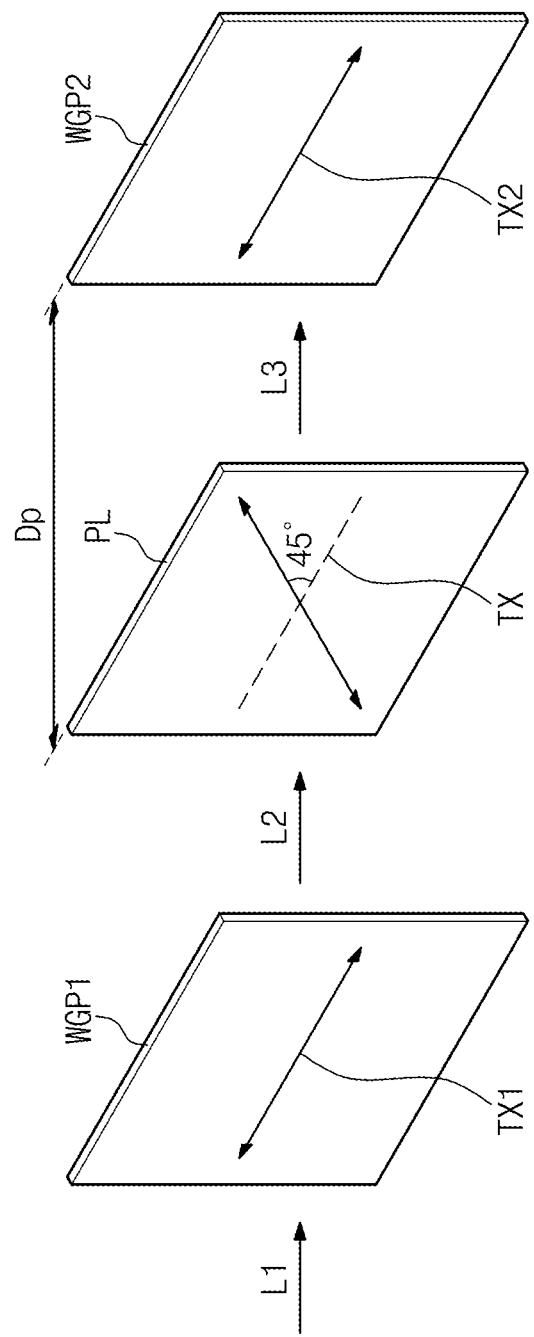
FIG. 4 is a view showing a principle of displaying grayscales in the display panel shown in FIGS. 1, 2 and 3.

FIG. 4 is a view showing a principle of displaying grayscales in the display panel 100 shown in FIGS. 1 to 3.

Referring to FIGS. 3 and 4, a light L1 emitted from the light source 201 is linearly polarized substantially parallel to the first transmission axis TX1 while passing through the first linear polarizing plate WGP1 having the first transmission axis TX1. The linearly-polarized light L2 is circularly polarized while passing through the circular polarizing plate PL. The circular polarizing plate PL has the transmission axis TX inclined at about 45 degrees with respect to the first transmission axis TX1.

The transmittance of the linearly-polarized light L3 with respect to the second linear polarized plate WGP2 is determined depending on the phase delay distance Dp. The linearly-polarized light L3 may have a phase that differs by the phase delay distance Dp. The second linear polarizing plate WGP2 has a second transmission axis TX2 substantially parallel to the first transmission axis TX1.

The phase delay distance Dp and a phase change value Pz may be defined by the following Equation 1.

$$Dp = Pz = \frac{(m \times \lambda)}{4} \quad \text{Equation 1}$$

In Equation 1, Dp denotes the phase delay distance, Pz denotes the phase change value, m is a positive real number, and $\lambda$ denotes a wavelength of the incident light.

In the case where m is 1, the phase of the circularly-polarized light L3 is changed by $\lambda/4$, i.e., about 90 degrees, when the circularly-polarized light L3 travels the phase delay distance Dp, and thus the circularly-polarized light L3 is substantially perpendicular to the second transmission axis TX2. Accordingly, when m is 1, the circularly-polarized light L3 may not transmit through the second linearly-polarized plate WGP2. Similarly, when m is an odd number, the phase of the circularly-polarized light L3 is changed by about 90 degrees or about 270 degrees, and thus does not transmit through the second linear polarizing plate WGP2.

In the case where m is 2, the phase of the circularly-polarized light L3 is changed by $\lambda/2$, i.e., about 180 degrees, when the circularly-polarized light L3 travels the phase delay distance Dp, and thus the circularly-polarized light L3 is substantially parallel to the second transmission axis TX2. Therefore, when m is 2, the circularly-polarized light L3 may transmit through the second linearly-polarized plate WGP2. Similarly, when m is an even number, the phase of the circularly-polarized light L3 is changed by about 180 degrees or about 360 degrees, and thus transmits through the second linear polarizing plate WGP2.

In the case where m is a value between 1 and 2, a portion of the circularly-polarized light L3 transmits through the second linear polarizing plate WGP2 and the other portion of the circularly-polarized light L3 does not transmit through the second linear polarizing plate WGP2.

In the present exemplary embodiment, the phase delay distance Dp may be changed by a height Hs in the third direction DR3 of the shutter SHT. Thus, when an intensity of the electric field applied to the shutter SHT is controlled, a transmittance of the light emitted from the light source 201 and passing through the display panel 100 may be determined and various grayscales may be realized.

The display panel 100 according to various embodiments of the present disclosure may display the image using a new operation mode.

Figure 5:
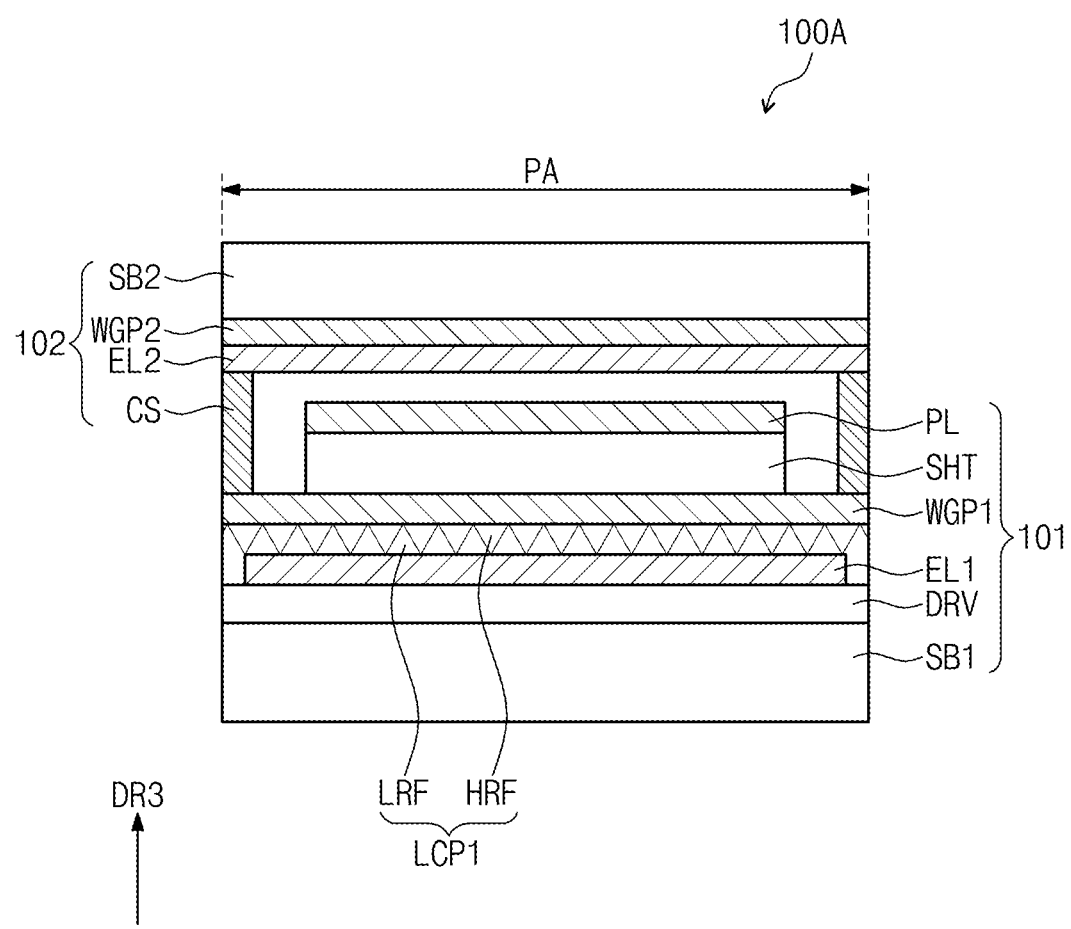
FIGS. 5, 6 and 7 are cross-sectional views showing one pixel area of display panels according to various exemplary embodiments of the present disclosure.
Figure 6:
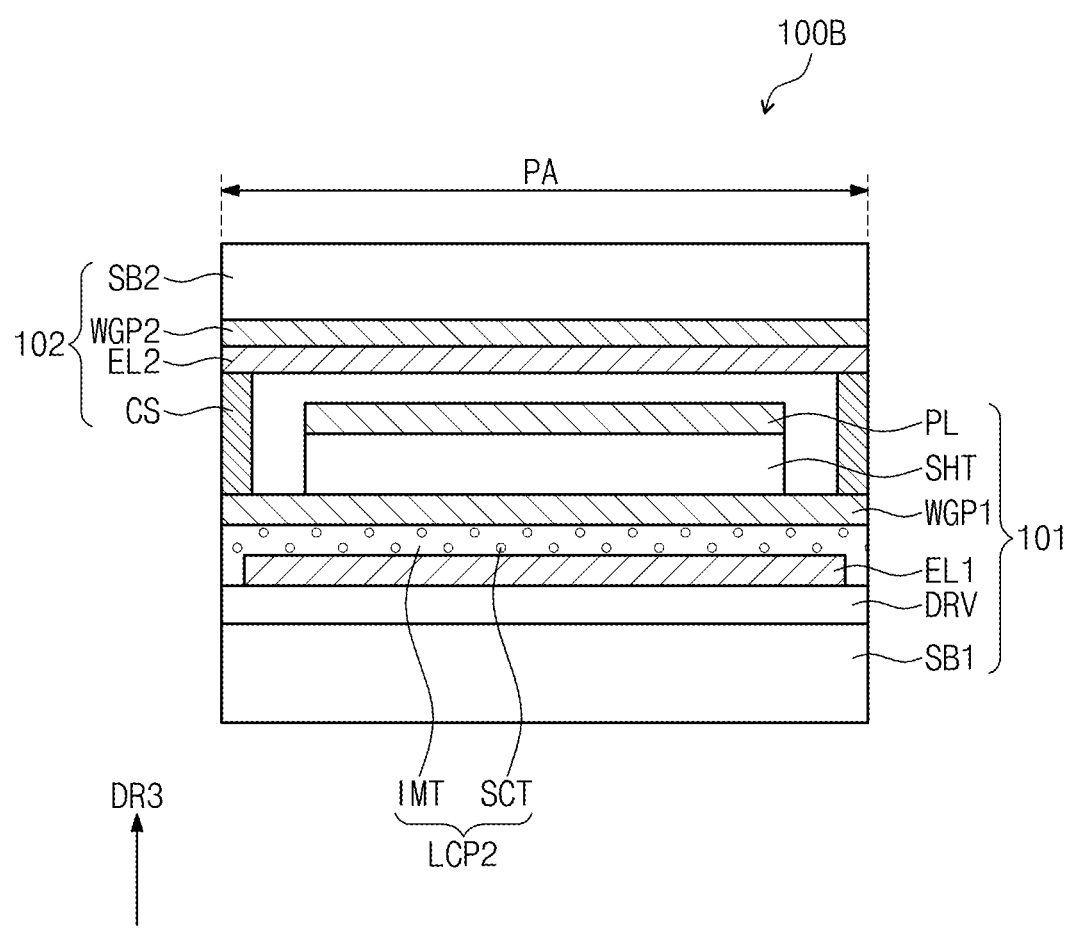
Figure 7:
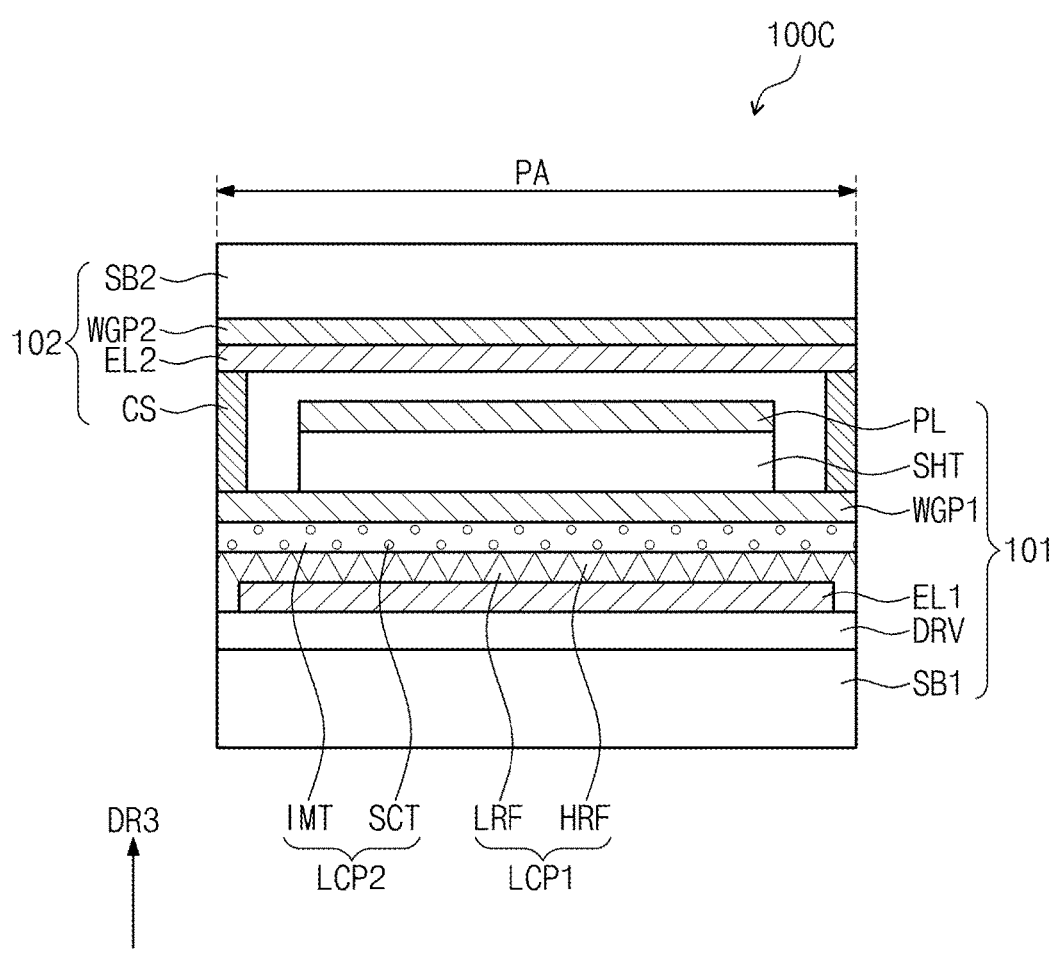

FIGS. 5 to 7 are cross-sectional views showing one pixel area of display panels according to various exemplary embodiments of the present disclosure.

Referring to FIG. 5, a display panel 100A may further include a first optical compensation layer LCP1 compared with the display panel 100 shown in FIG. 3.

The first optical compensation layer LCP1 includes a low refractive index pattern LRF and a high refractive index pattern HRF. The low refractive index pattern LRF includes a material having a refractive index relatively lower than that of the high refractive index pattern HRF. The low refractive index pattern LRF may have a triangular pattern shape.

The high refractive index pattern HRF is disposed on the low refractive index pattern LRF. The high refractive index pattern HRF includes a material having a refractive index relatively higher than that of the low refractive index pattern LRF. The high refractive index pattern HRF may have a up-side-down triangular pattern shape.

The first optical compensation layer LCP1 improves a front emission ratio of the incident light using a difference in refractive index between the low refractive index pattern LRF and the high refractive index pattern HRF. The display panel 100A including the first optical compensation layer LCP1 may have improved brightness.

Each of the low refractive index pattern LRF and the high refractive index pattern HRF includes an insulating material. The first electrode EL1 and the first linear polarizing plate WGP1 include a conductive material. The first optical compensation layer LCP1 is disposed between the first electrode EL1 and the first linear polarizing plate WGP1 to reduce electrical interference between the first electrode EL1 and the first linear polarizing plate WGP1, but it is not limited thereto or thereby. For example, the first optical compensation layer LCP1 may be disposed between the first substrate SB1 and the driving layer DRV or between the driving layer DRV and the first electrode EL1.

Referring to FIG. 6, a display panel 100B may further include a second optical compensation layer LCP2 compared with the display panel 100 shown in FIG. 3.

The second compensation layer LCP2 may include an insulating material IMT and scattering particles SCT distributed in the insulating material IMT.

The second optical compensation layer LCP2 scatters the light incident thereto. The display panel 100B including the second optical compensation layer LCP2 may have improved viewing angle.

The second optical compensation layer LCP2 is disposed between the first electrode EL1 and the first linear polarizing plate WGP1 to reduce electrical interference between the first electrode EL1 and the first linear polarizing plate WGP1, but it is not limited thereto or thereby. For example, the second optical compensation layer LCP2 may be disposed between the first substrate SB1 and the driving layer DRV or between the driving layer DRV and the first electrode EL1.

Referring to FIG. 7, a display panel 100C may further include a first optical compensation layer LCP1 and a second optical compensation layer LCP2 compared with the display panel 100 shown in FIG. 3.

The first optical compensation layer LCP1 is disposed on the first electrode EL1 and the driving layer DRV. The second optical compensation layer LCP2 is disposed on the first optical compensation layer LCP1.

Since the first and second compensation layers LCP1 and LCP2 are described in detail with reference to FIGS. 5 and 6, respectively, details thereof are omitted.

The display panel 100C including the first and second optical compensation layers LCP1 and LCP2 may have improved brightness and viewing angle.

Figure 8:
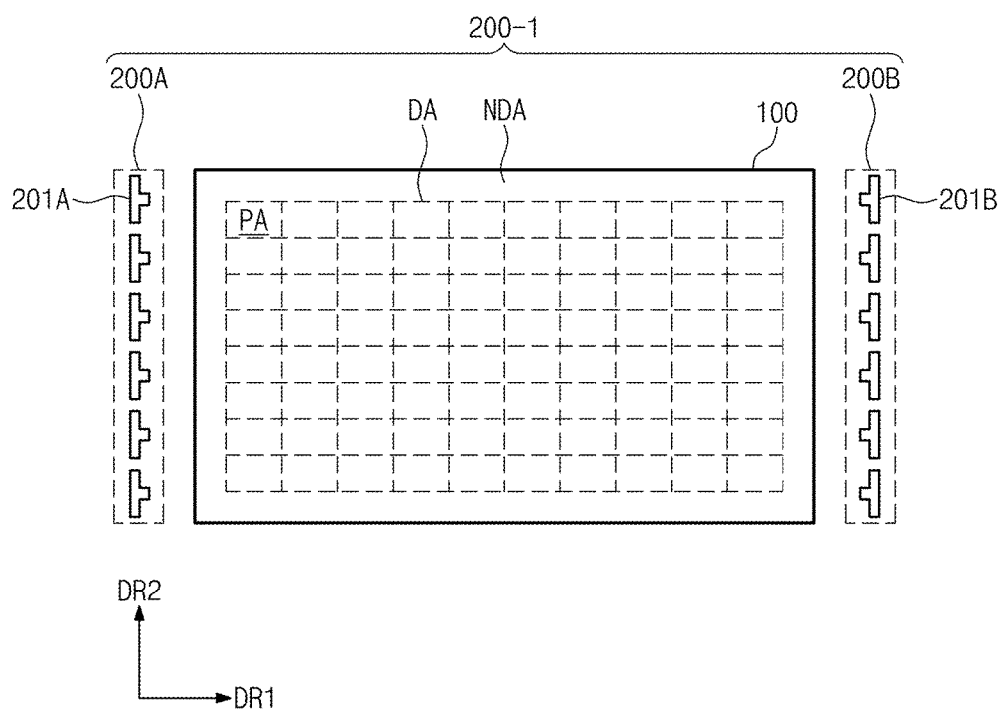
FIG. 8 is a plan view showing a display panel and a light source part according to another exemplary embodiment of the present disclosure.

FIG. 8 is a plan view showing a display panel 100 and a light source part 200-1 according to another exemplary embodiment of the present disclosure.

The light source part 200-1 shown in FIG. 8 provides the light to both side surfaces (e.g., two opposing side surfaces) of the display panel 100 compared with the light source part 200 shown in FIG. 2.

Referring to FIG. 8, the light source part 200-1 includes a first light source part 200A and a second light source part 200B. The first light source part 200A provides the light to one side surface of the display panel 100, and second light source part 200B provides the light to the other side surface of the display panel 100, which faces the one side surface.

The first light source part 200A includes a plurality of first light sources 201A, and the second light source part 200B includes a plurality of second light sources 201B. Each of the first and second light sources 201A and 201B may include red, green, and blue light sources. According to another embodiment, each of the first and second light sources 201A and 201B may include white light sources.

Figure 9:
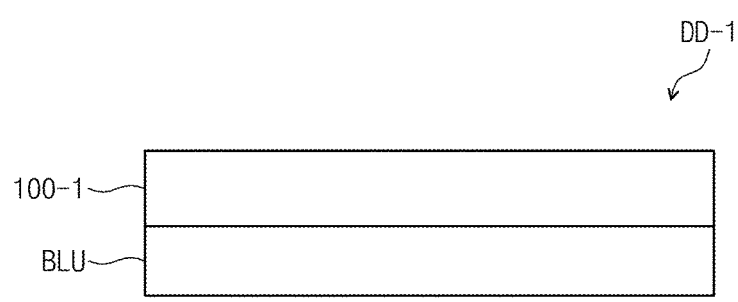
FIG. 9 is a side view showing a display apparatus according to an exemplary embodiment of the present disclosure.

FIG. 9 is a side view showing a display apparatus DD-1 according to an exemplary embodiment of the present disclosure.

Referring to FIG. 9, the display apparatus DD-1 includes a display panel 100-1 and a backlight unit BLU.

The backlight unit BLU is disposed under the display panel 100-1. The backlight unit BLU provides the light to a lower portion of the display panel 100-1. The backlight unit BLU includes a light source part and a light source driver as described with reference to FIGS. 1 and 2, and thus details thereof are omitted.

Hereinafter, display panels 100D to 100G that are described with reference to FIGS. 10 to 13 may be example modifications of the display panel 100-1 shown in FIG. 9. The display panels 100D to 100G shown in FIGS. 10 to 13 may receive the light from the backlight unit BLU disposed under the display panels 100D to 100G.

Figure 10:
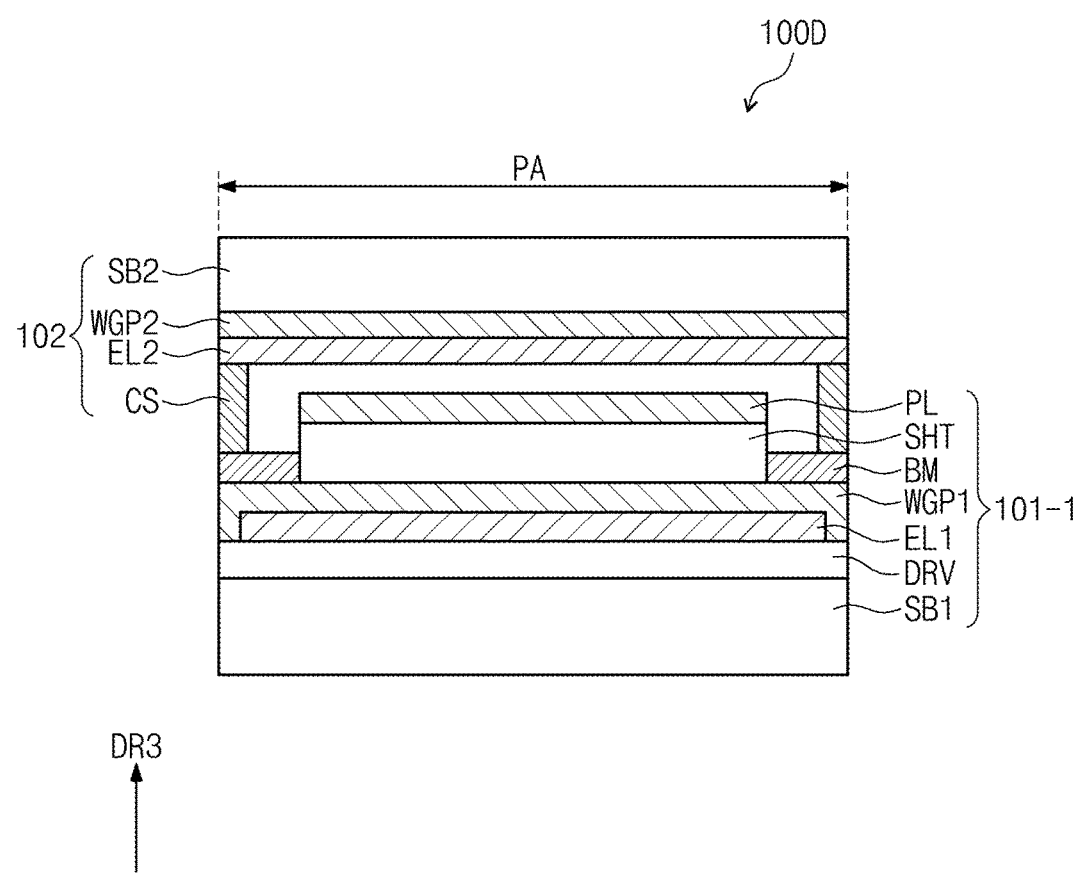
FIGS. 10 and 11 are cross-sectional views showing one pixel area of display panels according to various exemplary embodiments of the present disclosure.

FIG. 10 is a cross-sectional view showing one pixel area of the display panel 100D according to an exemplary embodiment of the present disclosure.

The display panel 100D shown in FIG. 10 may further include a black matrix BM compared with the display panel 100 shown in FIG. 3.

The black matrix BM may be included in a lower substrate 101-1. The black matrix BM may be disposed on the first linear polarizing plate WGP1. The black matrix BM may be disposed not to overlap with the shutter SHT. The black matrix BM absorbs the light except for the light incident to the shutter SHT, and thus the black matrix BM prevents light leakage from occurring.

Figure 11:
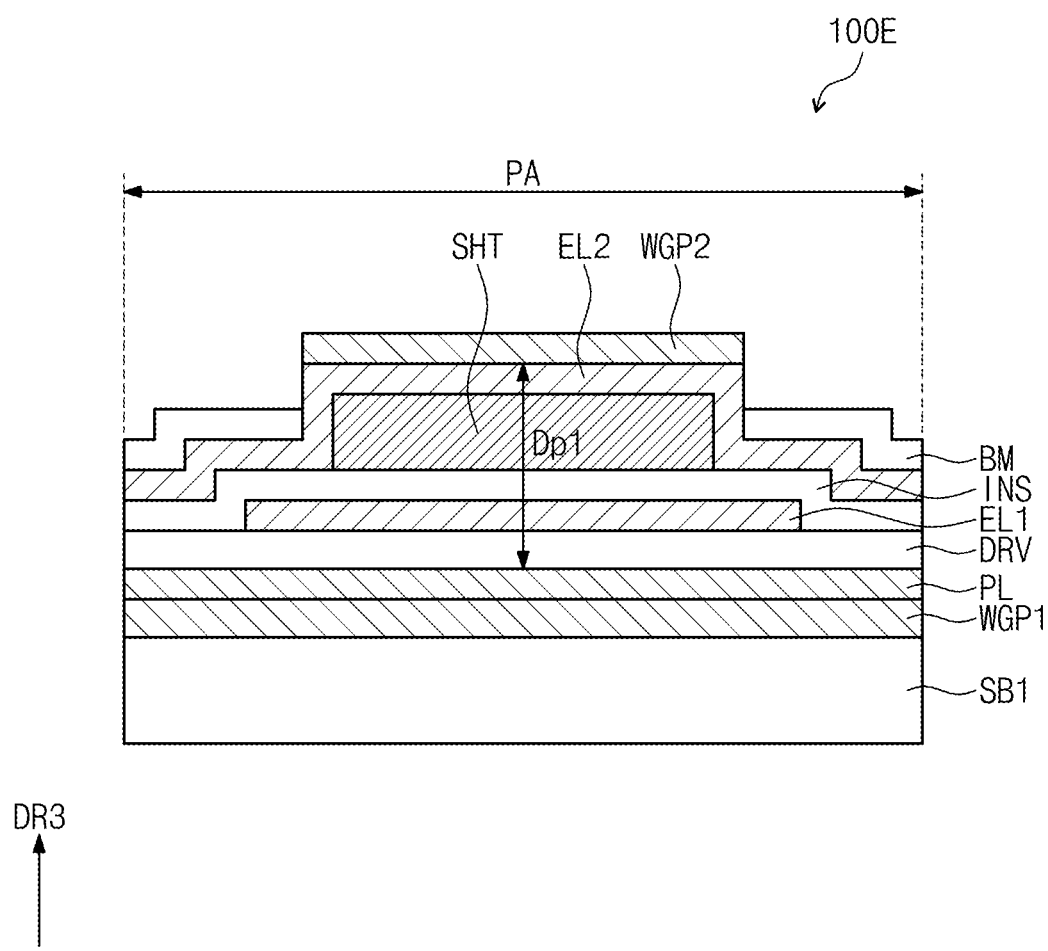

FIG. 11 is a cross-sectional view showing one pixel area of the display panel 100E according to an exemplary embodiment of the present disclosure.

Referring to FIG. 11, the display panel 100E includes a first substrate SB1, a first linear polarizing plate WGP1, a circular polarizing plate PL, a driving layer DRV, a first electrode EL1, an insulating layer INS, a shutter SHT, a second electrode EL2, a second linear polarizing plate WGP2, and a black matrix BM.

Hereinafter, different features of the display panel 100E shown in FIG. 11 from those of the display panel 100 shown in FIG. 3 are mainly described.

The first linear polarizing plate WGP1 is disposed on the first substrate SB1.

The circular polarizing plate PL is disposed on the first linear polarizing plate WGP1. The driving layer DRV is disposed on the circular polarizing plate PL. The first electrode EL1 is disposed on the driving layer DRV.

The insulating layer INS is disposed on the driving layer DRV and the first electrode EL1. The insulating layer INS includes an insulating material to insulate the first electrode EL1 and the second electrode EL2.

The shutter SHT is disposed on the insulating layer INS.

The second electrode EL2 is disposed on the insulating layer INS and the shutter SHT. The second electrode EL2 is a transparent electrode and may be flexible so that even when the shutter SHT is mechanically deformed, the second electrode EL2 may be prevented from being cracked.

The second electrode EL2 may include a metal nanowire, a metal mesh, a conductive polymer, a graphene, and a carbon nanotube.

The second linear polarizing plate WGP2 is disposed on the second electrode EL2. The second linear polarizing plate WGP2 is disposed to overlap with the shutter SHT.

The black matrix BM is disposed on the second electrode EL2. The black matrix BM is disposed not to overlap with the shutter SHT. The black matrix BM absorbs the light except for the light incident to the shutter SHT to prevent the light leakage from occurring.

The display panel 100E does not include the second substrate SB2 compared with the display panel 100 shown in FIG. 3. The display panel 100E may have a thickness reduced by a thickness of the second substrate SB2.

Figure 12:
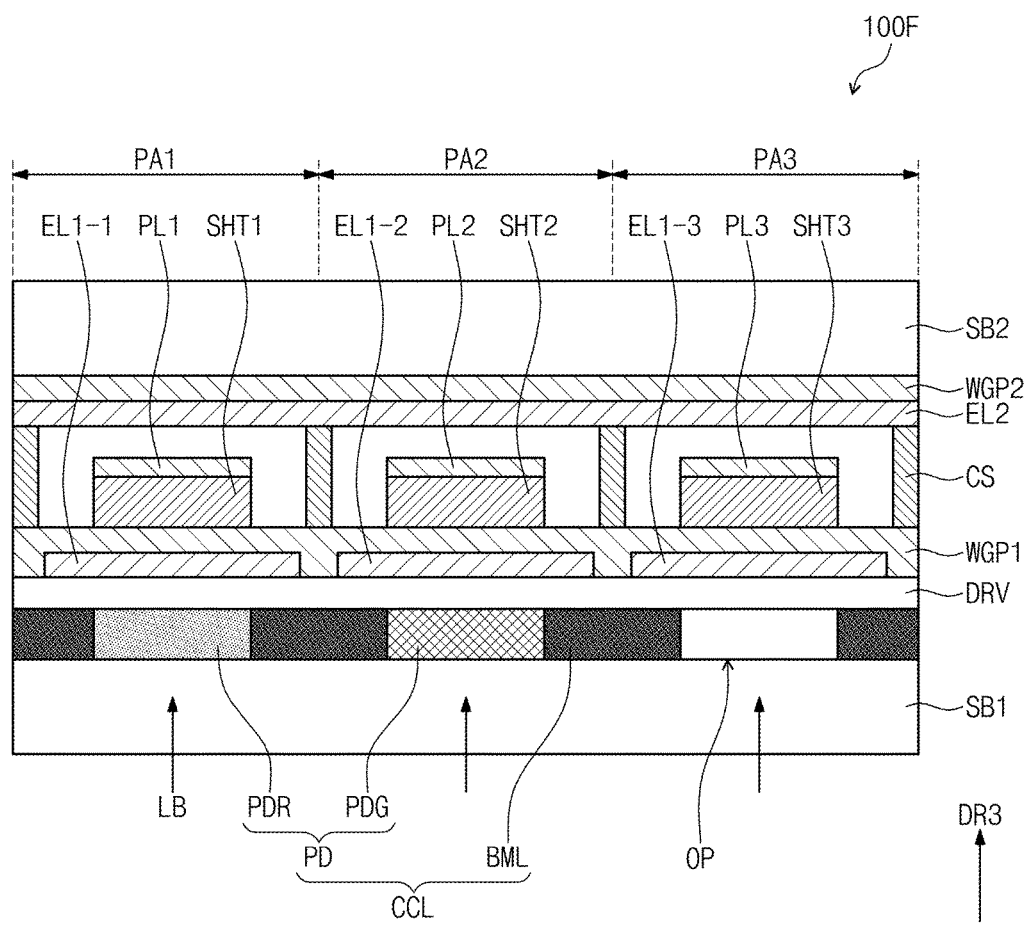
FIGS. 12 and 13 are cross-sectional views showing three pixel areas of display panels according to various exemplary embodiments of the present disclosure.

FIG. 12 is a cross-sectional view showing three pixel areas of a display panel 100F according to an exemplary embodiment of the present disclosure.

Referring to FIG. 12, the display panel 100F includes first, second, and third pixel areas PA1, PA2, and PA3.

The first pixel area PA1 is configured to transmit a red light, the second pixel area PA2 is configured to transmit a green light, and the third pixel area PA3 is configured to transmit a blue light.

In the display apparatus including the display panel 100F shown in FIG. 12, the backlight unit BLU provides a blue light LB to the display panel 100F. The display panel 100F receives the blue light LB from the backlight unit BLU disposed under the display panel 100F.

Shutters SHT1, SHT2, and SHT3 are respectively disposed in the first to third pixel areas PA1 to PA3. First electrodes EL1-1, EL1-2, and EL1-3 are respectively disposed in the first to third pixel areas PA1 to PA3. Circular polarizing plate PL1, PL2, and PL3 are respectively disposed in the first to third pixel areas PA1 to PA3.

The display panel 100F shown in FIG. 12 may further include a color conversion layer CCL compared with the display panel 100 shown in FIG. 3. The color conversion layer CCL is disposed between a first substrate SB1 and a driving layer DRV.

The color conversion layer CCL may include a light emitting layer PD and a black matrix BML. The light emitting layer PD absorbs a light and emits a light having a wavelength longer than that of the absorbed light. The light emitting layer PD may include at least one of an organic light emitting material, a phosphor, and a quantum dot. The black matrix BML may be disposed not to overlap with the first to third shutters SHT1 to SHT3.

The light emitting layer PD includes a red light emitting layer PDR and a green light emitting layer PDG. The red light emitting layer PDR is disposed to overlap with the shutter SHT1 disposed in the first pixel area PA1. The red light emitting layer PDR receives the blue light LB and, in response, emits a red light.

The green light emitting layer PDG is disposed to overlap with the shutter SHT2 disposed in the second pixel area PA2. The green light emitting layer PDG receives the blue light LB and, in response, emits a green light.

The light emitting layer PD includes an opening OP formed therethrough and disposed to overlap with the shutter SHT3 disposed in the third pixel area PA3. The blue light LB may be incident to the shutter SHT3 through the opening OP without changing the wavelength of the blue light LB. According to another embodiment, the opening OP may be filled with a transparent material.

Since the red, green, and blue colors have different wavelengths from each other, the shutters SHT1 to SHT3 may have different heights from each other even though the first to third pixel areas PA1 to PA3 display the same grayscales.

Figure 13:
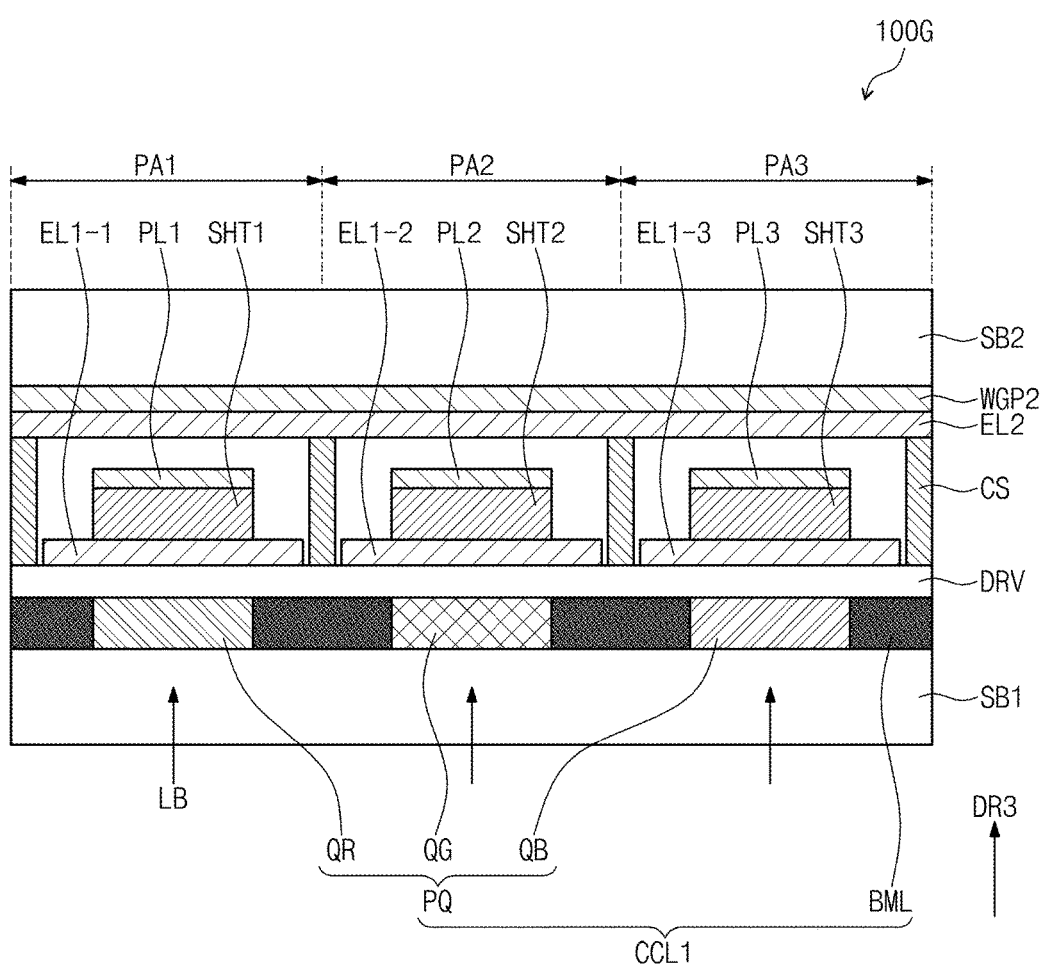

FIG. 13 is a cross-sectional view showing three pixel areas of a display panel 100G according to an exemplary embodiment of the present disclosure.

The display panel 100G shown in FIG. 13 may have the same structure and function as those of the display panel 100F shown in FIG. 12 except for a color conversion layer CCL1 and the first linear polarizing plate WGP1. Hereinafter, different features between the display panel 100G shown in FIG. 13 and the display panel 100F shown in FIG. 12 are mainly described.

The color conversion layer CCL1 of the display panel 100G is disposed between the first substrate SB1 and the driving layer DRV.

The color conversion layer CCL1 includes a light emitting layer PQ and a black matrix BML. The light emitting layer PQ absorbs a light and emits a light having a wavelength longer than that of the absorbed light. In addition, the light emitting layer PQ linearly polarizes the light incident thereto. The light emitting layer PQ may include rod-shape quantum materials.

The light emitting layer PQ linearly polarizes the light incident thereto, and thus the display panel 100G shown in FIG. 13 does not need to include the first linear polarizing plate WGP1 included in the display panel 100F shown in FIG. 12.

The light emitting layer PQ includes a red light emitting layer QR, a green light emitting layer QG, and a blue light emitting layer QB. The red light emitting layer QR is disposed to overlap with the shutter SHT1 disposed in the first pixel area PA1. The red light emitting layer QR receives the blue light LB and, in response, emits the red light.

The green light emitting layer QG is disposed to overlap with the shutter SHT2 disposed in the second pixel area PA2. The green light emitting layer QG receives the blue light LB and, in response, emits the green light.

The blue light emitting layer QB is disposed to overlap with the shutter SHT3 disposed in the third pixel area PA3. The blue light emitting layer QB receives the blue light LB and emits modified blue light having a partially different wavelength from that of the blue light LB.

Figure 14:
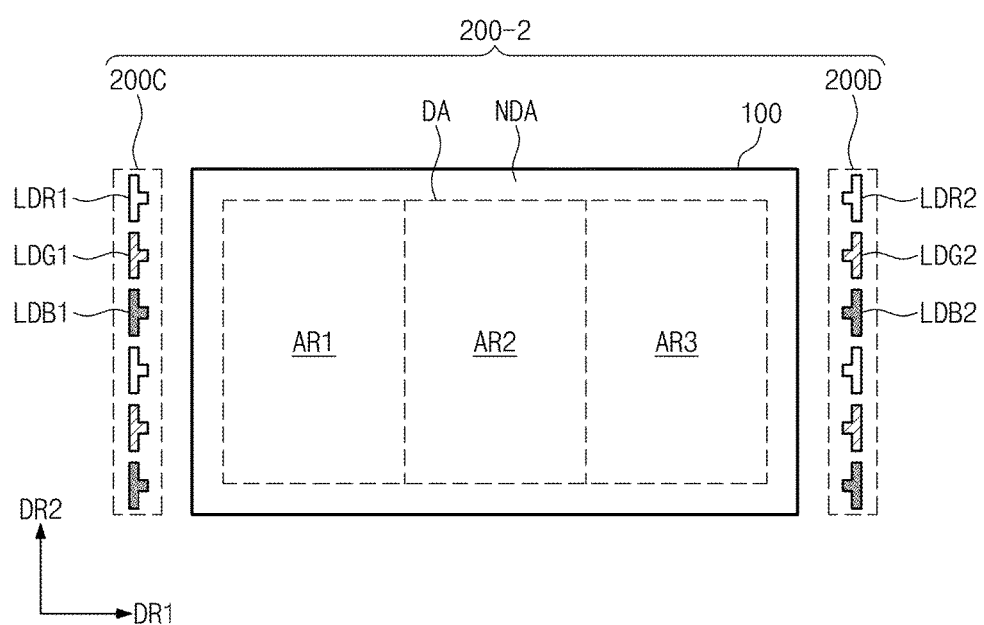
FIG. 14 is a plan view showing a display panel and a light source part according to another exemplary embodiment of the present disclosure.

FIG. 14 is a plan view showing a display panel 100 and a light source part 200-2 according to another exemplary embodiment of the present disclosure.

Referring to FIG. 14, the light source part 200-2 includes a first light source part 200C and a second light source part 200D. The first light source part 200C provides a light to one side surface of the display panel 100, and the second light source part 200D provides the light to the other side surface of the display panel 100, which faces the one side surface of the display panel 100.

Each of the first and second light source parts 200C and 200D includes a plurality of light sources. In the present exemplary embodiment, the first light source part 200C includes a red light source LDR1, a green light source LDG1, and a blue light source LDB1. The second light source part 200D includes a red light source LDR2, a green light source LDG2, and a blue light source LDB2.

The first and second light source parts 200C and 200D may provide the light to a side surface of a first substrate SB1 as described with reference to FIG. 3. The first and second light source parts 200C and 200D may be included in the backlight unit BLU disposed under the display panel 100-1 as shown in FIG. 9 and may be disposed at an edge of the backlight unit BLU.

The display panel 100 includes first, second, and third areas AR1, AR2, and AR3. The first, second, and third areas AR1, AR2, and AR3 are distinct from each other on the basis of a distance from the first and second light source parts 200C and 200D. The first, second, and third areas AR1, AR2, and AR3 are disposed adjacent to each other in a first direction DR1.

The first area AR1 is disposed more adjacent to the first light source part 200C than the second area AR2. The third area AR3 is disposed more adjacent to the second light source part 200C than the second area AR2.

When the pixels disposed in the first to third areas AR1 to AR3 receive the same data voltage, a brightness of the second area AR2 may be lower than a brightness of the first area AR1 and a brightness of the third area AR3.

Figure 15:
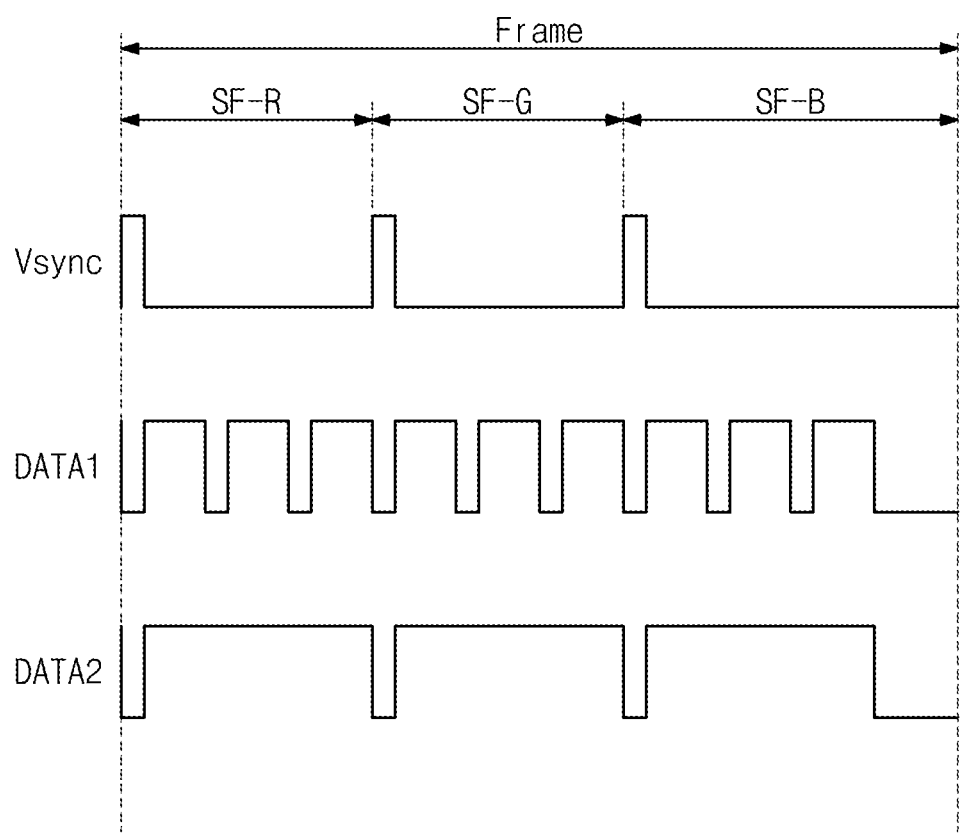
FIG. 15 is a waveform diagram showing signals used to drive the display panel shown in FIG. 14 during one frame period.

FIG. 15 is a waveform diagram showing signals used to drive the display panel 100 shown in FIG. 14 during one frame period. In detail, FIG. 15 shows the scan start signal Vsync, the data voltage DATA1 applied to one pixel (hereinafter, referred to as a first pixel) disposed in the second area AR2, and the data voltage DATA2 applied to one pixel (hereinafter, referred to as a second pixel) disposed in the first area AR1 or the third area AR3.

Referring to FIGS. 1, 14, and 15, the display panel 100 displays the image corresponding to one screen, i.e., one frame. The display panel 100 is operated in a red sub-frame SF-R, a green sub-frame SF-G, and a blue sub-frame SF-B during one frame.

The display panel 100 displays a red image during the red sub-frame SF-R, displays a green image during the green sub-frame SF-G, and displays a blue image during the blue sub-frame SF-B.

The red light sources LDR1 and LDR2 of the first and second light source parts 200C and 200D emit the red light during the red sub-frame SF-R. The green light sources LDG1 and LDG2 of the first and second light source parts 200C and 200D emit the green light during the green sub-frame SF-G. The blue light sources LDB1 and LDB2 of the first and second light source parts 200C and 200D emit the blue light during the blue sub-frame SF-B.

When the scan start signal Vsync is applied during the red sub-frame SF-R, the pixels disposed in the first to third areas AR1 to AR3 receive the data voltage to sequentially display the red image in the unit of row.

When the scan start signal Vsync is applied during the green sub-frame SF-G, the pixels disposed in the first to third areas AR1 to AR3 receive the data voltage to sequentially display the green image in the unit of row.

When the scan start signal Vsync is applied during the blue sub-frame SF-B, the pixels disposed in the first to third areas AR1 to AR3 receive the data voltage to sequentially display the blue image in the unit of row.

The data voltage DATA1 applied to the first pixel and the data voltage DATA2 applied to the second pixel are used to display the images having the same brightness.

During each of the red sub-frame SF-R, the green sub-frame SF-G, and the blue sub-frame SF-B, the data voltage DATA1 applied to the first pixel has a duty ratio smaller than a duty ratio of the data voltage DATA2 applied to the second pixel.

As described above, since the data voltage DATA1 applied to the first pixel has the duty ratio smaller than that of the data voltage DATA2 applied to the second pixel, the first, second, and third areas AR1, AR2, and AR3 may display the image with uniform brightness regardless of the distance from the first and second light source parts 200C and 200D.

According to various embodiments of the present disclosure, the display device DD displays grayscale values in accordance with the intensity of the electric field applied to the shutter. Since the shutter has a response time faster than that of liquid crystals, the display device DD has advantages over the liquid crystal display with respect to a time-sequential driving by colors as described with reference to FIGS. 14 and 15.

Although the exemplary embodiments of the present disclosure have been described, it is understood that the present disclosure is not limited to these exemplary embodiments. Rather, various changes and modifications may be made by one ordinary skilled in the art within the spirit and scope of the present disclosure.

What is claimed is:

1. A display apparatus comprising:
a light source configured to emit a light; and
a display panel configured to display an image using the light provided from the light source, the display panel comprising:
a first substrate;
a first polarizing plate disposed on the first substrate and configured to receive the light provided from the light source and incident to a lower portion of the first polarizing plate and to linearly polarize the light incident thereto;
a second polarizing plate disposed on the first polarizing plate and configured to circularly polarize the light exiting through the first polarizing plate;
a third polarizing plate disposed on the second polarizing plate and configured to linearly polarize the light incident thereto; and
a shutter disposed on the first polarizing plate and configured to mechanically deform in a thickness direction of the first polarizing plate in response to an electrical signal, wherein the display apparatus is configured to display a grayscale in accordance with mechanical deformation of the shutter, wherein the shutter is configured to mechanically deform in at least a portion of the shutter that overlaps with the first and second polarizing plates in the thickness direction of the first polarizing plate.

2. The display apparatus of claim 1, wherein a distance between the second and third polarizing plates is controlled by mechanical deformation of the shutter.

3. The display apparatus of claim 1, wherein the first polarizing plate has a first transmission axis, the second polarizing plate has a second transmission axis inclined at about 45 degrees with respect to the first transmission axis, and the third polarizing plate has a third transmission axis substantially parallel to or substantially perpendicular to the first transmission axis.

4. The display apparatus of claim 1, wherein the display panel comprises a plurality of pixel areas defined therein, the shutter is provided in a plural number, and each of the shutters is independently disposed within a different one of the pixel areas.

5. The display apparatus of claim 1, wherein the display panel further comprises:
a first electrode disposed on the first substrate; and
a second electrode disposed to face the first electrode such that the shutter is disposed between the first and second electrodes, and the electrical signal is an electric field generated by voltages respectively applied to the first and second electrodes.

6. The display apparatus of claim 5, wherein the first polarizing plate is disposed on the first electrode, the shutter is disposed between the first and second polarizing plates, the second polarizing plate is spaced apart from the second electrode, and the second and third polarizing plates are spaced apart from each other.

7. A display apparatus comprising:
a light source configured to emit a light; and
a display panel configured to display an image using the light provided from the light source, the display panel comprising:
a first substrate;
a first electrode disposed on the first substrate
a first polarizing plate disposed on the first substrate and configured to receive the light provided from the light source and incident to a lower portion of the first polarizing plate and to linearly polarize the light incident thereto;
a second polarizing plate disposed on the first polarizing plate and configured to circularly polarize the light exiting through the first polarizing plate;
a third polarizing plate disposed on the second polarizing plate and configured to linearly polarize the light incident thereto;
a shutter disposed on the first polarizing plate and configured to mechanically deform in a thickness direction of the first polarizing plate in response to an electrical signal, wherein the display apparatus display a grayscale in accordance with mechanical deformation of the shutter; and
a second electrode disposed to face the first electrode such that the shutter is disposed between the first and second electrodes,
wherein the display panel further comprises an optical compensation layer disposed between the first electrode and the first polarizing plate.

8. The display apparatus of claim 7, wherein the optical compensation layer comprises:
a low refractive index pattern having a triangular pattern shape; and
a high refractive index pattern disposed on the low refractive index pattern, comprising a material having a refractive index relatively higher than the low refractive index pattern, and having an up-side-down triangular shape.

9. The display apparatus of claim 7, wherein the optical compensation layer comprises an insulating material and scattering particles distributed in the insulating material.

10. The display apparatus of claim 5, wherein the display panel further comprises an insulating layer disposed between the first electrode and the shutter, the second electrode makes contact with the shutter and the insulating layer, and the second electrode is a flexible transparent electrode.

11. The display apparatus of claim 5, wherein the first and second polarizing plates are disposed between the first substrate and the first electrode.

12. The display apparatus of claim 1, wherein the light source is disposed adjacent to a side surface of the first substrate, and the light emitted from the light source is provided to the side surface of the first substrate.

13. The display apparatus of claim 1, wherein the light source is disposed under the first substrate and the light emitted from the light source is provided to a lower portion of the first substrate.

14. The display apparatus of claim 1, wherein the display panel further comprises a black matrix disposed on the first linear polarizing plate and not overlapped with the shutter.

15. The display apparatus of claim 1, wherein the light emitted from the light source is a blue light, and the display panel further comprises a light emitting layer that absorbs the blue light and emits a light having a wavelength longer than a wavelength of the blue light.

16. The display apparatus of claim 15, wherein the display panel comprises first, second, and third pixel areas different from each other and defined therein, and the light emitting layer comprises:
a red light emitting layer disposed in the first pixel area to emit a red light; and
a green light emitting layer disposed in the second pixel area to emit a green light.

17. The display apparatus of claim 15, wherein the display panel displays the image corresponding to one screen in the unit of frame, and the frame comprises a red sub-frame in which a red image is displayed, a green sub-frame in which a green image is displayed, and a blue sub-frame in which a blue image is displayed.

18. The display apparatus of claim 17, wherein the light source is disposed adjacent to a side surface of the display panel when viewed in a plan view, and the light source comprises a red light source, a green light source, and a blue light source.

19. The display apparatus of claim 18, wherein the display panel comprises a first area and a second area farther away from the light source than the first area when viewed in a plan view, and a duty ratio of a data voltage applied to a pixel disposed in the first area to display an image having a first brightness in the first area is smaller than a duty ratio of a data voltage applied to a pixel disposed in the second area to display an image having the first brightness in the second area.

20. A display apparatus comprising:
a light source configured to emit a light;
a first polarizing plate configured to receive the light provided from the light source and incident to a lower portion of the first polarizing plate and having a first transmission axis;
a second polarizing plate disposed on the first polarizing plate and having a second transmission axis substantially perpendicular to or parallel to the first transmission axis;
a third polarizing plate disposed between the first and second polarizing plates and having a third transmission axis crossing the first and second axes; and
a shutter disposed between the first and second polarizing plates and configured to mechanically deform in a thickness direction of the first polarizing plate in response to an electrical signal.

* * * * *